March 24, 1964     E. R. ANDERSON     3,126,087
METHOD AND APPARATUS FOR SPACED FEED OF ARTICLES
Filed Feb. 29, 1960     6 Sheets-Sheet 2
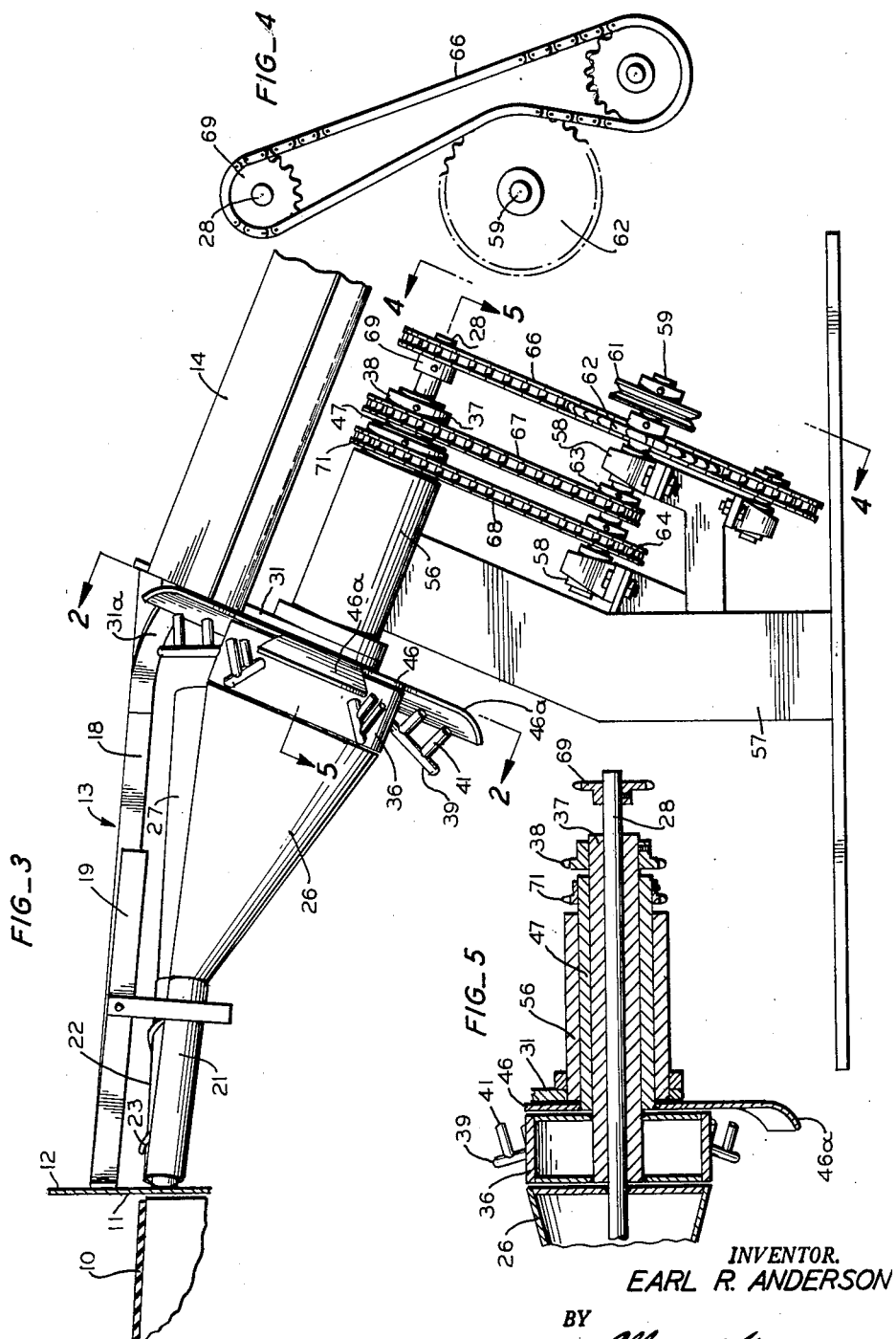
INVENTOR.
EARL R. ANDERSON
BY
ATTORNEYS

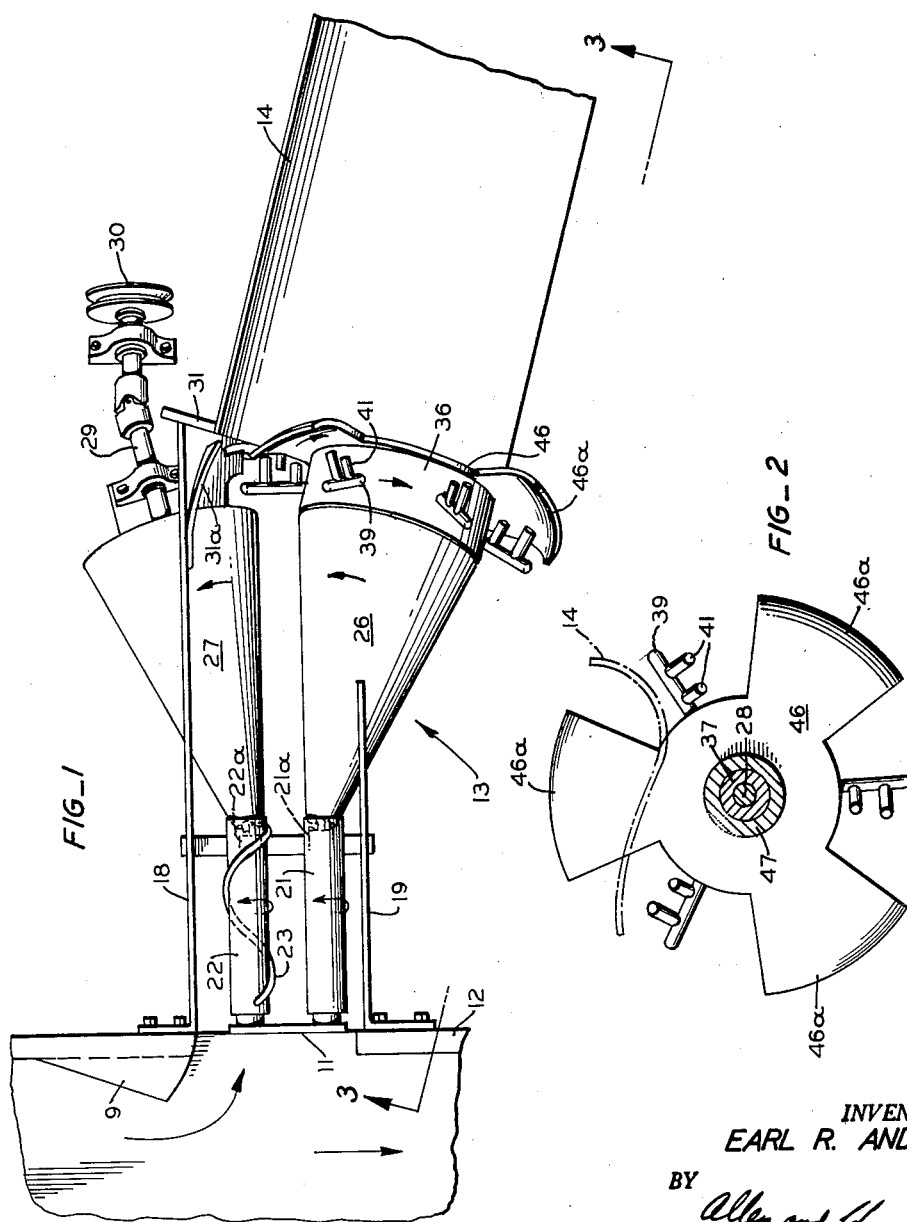

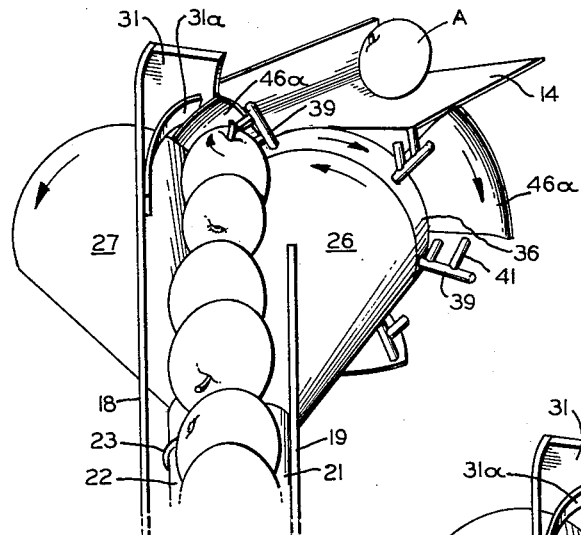
FIG_6
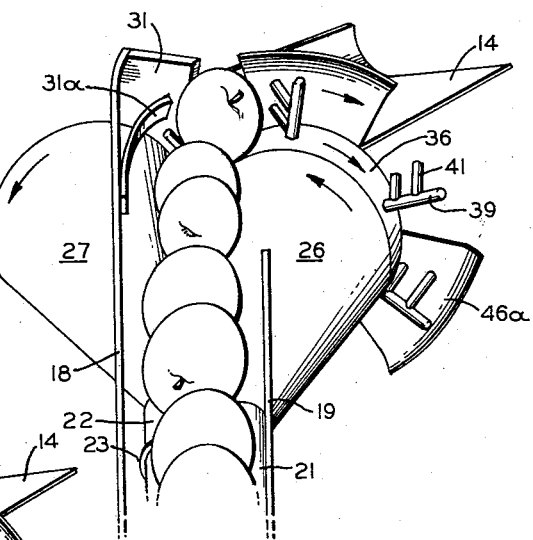
FIG_7
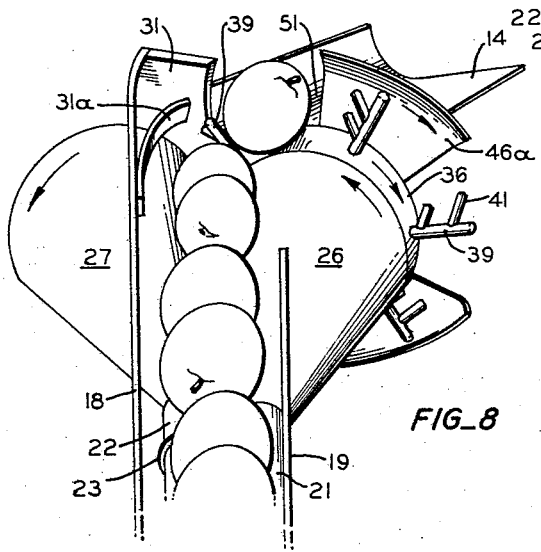
FIG_8

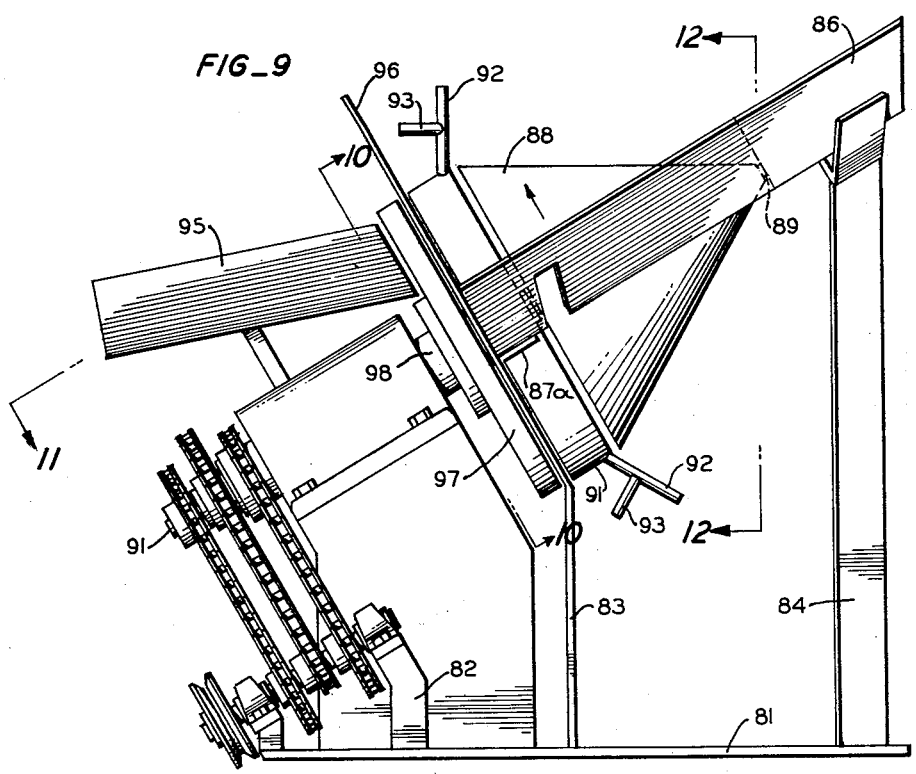
FIG_9
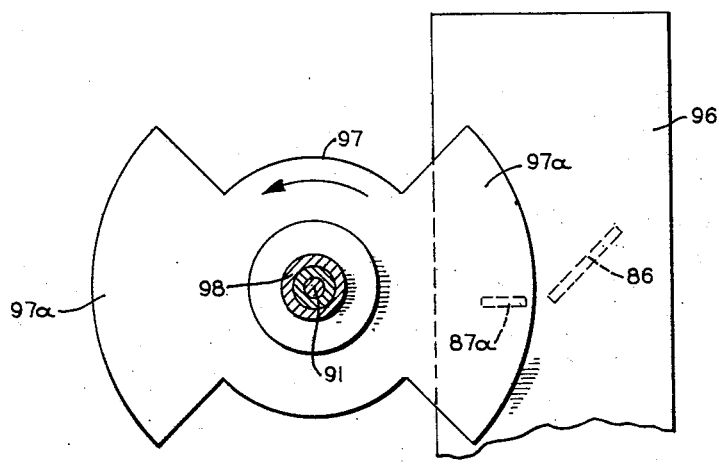
FIG_10

March 24, 1964 E. R. ANDERSON 3,126,087
METHOD AND APPARATUS FOR SPACED FEED OF ARTICLES
Filed Feb. 29, 1960 6 Sheets-Sheet 5
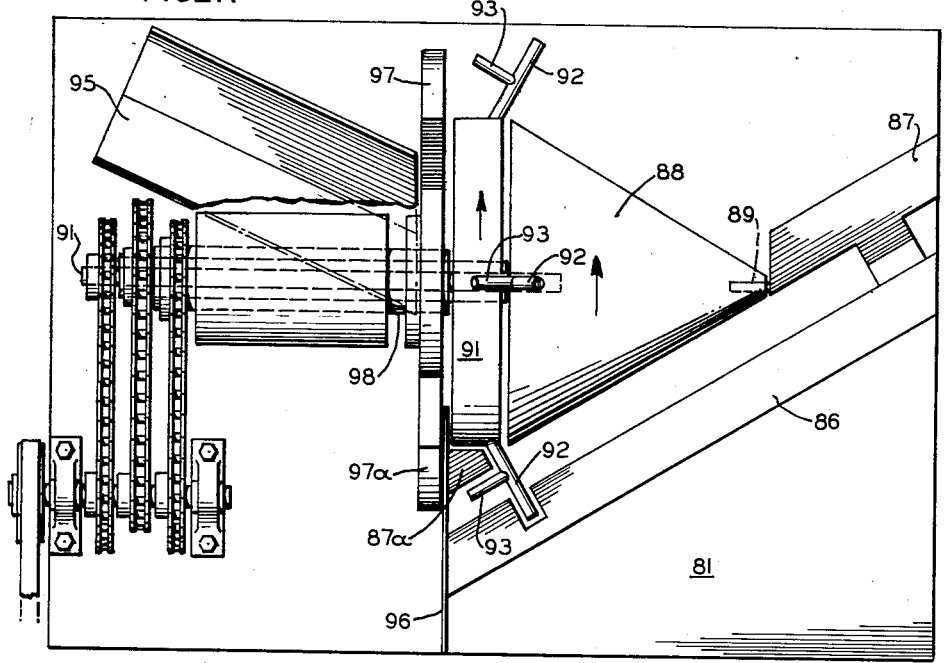
FIG_11
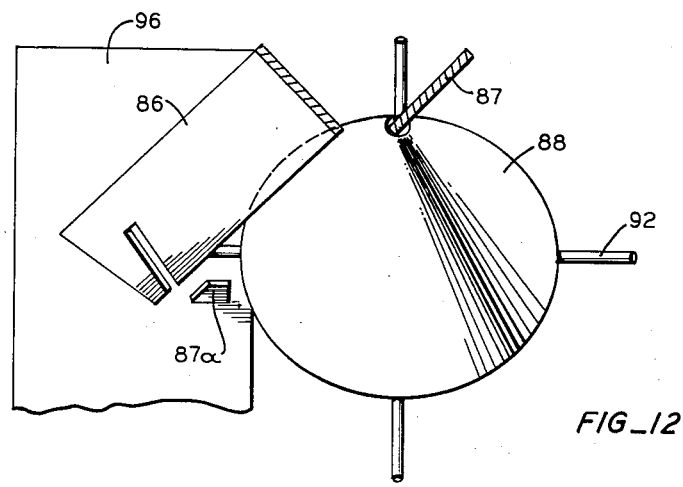
FIG_12
INVENTOR.
EARL R. ANDERSON
BY
ATTORNEYS March 24, 1964  E. R. ANDERSON  3,126,087
METHOD AND APPARATUS FOR SPACED FEED OF ARTICLES
Filed Feb. 29, 1960 6 Sheets-Sheet 6
FIG_13 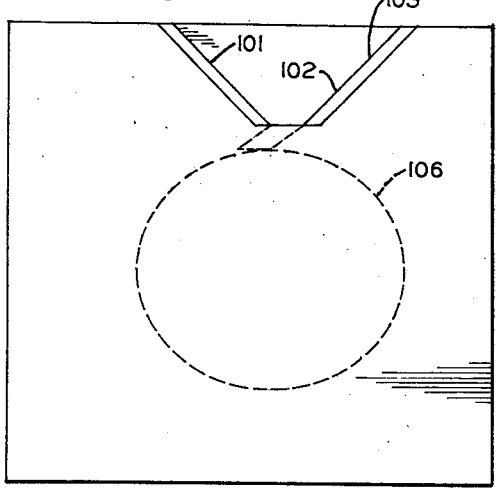
FIG_14 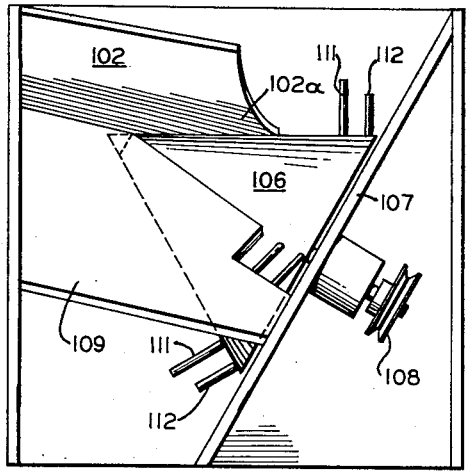
FIG_15 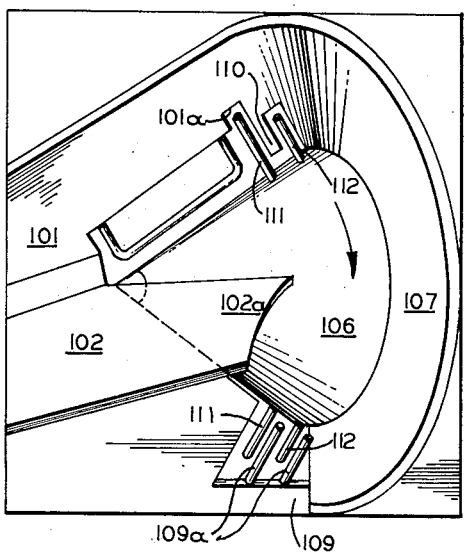
FIG_16 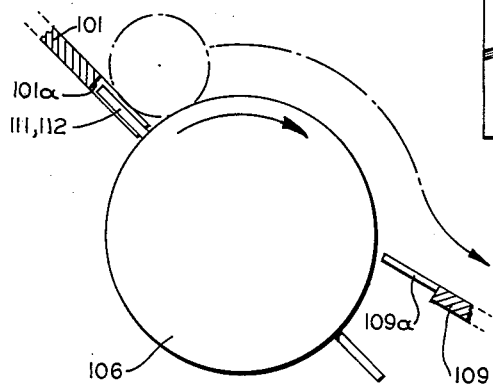
INVENTOR.
EARL R. ANDERSON
BY
ATTORNEYS

United States Patent Office 3,126,087
Patented Mar. 24, 1964

3,126,087
METHOD AND APPARATUS FOR SPACED FEED
OF ARTICLES
Earl R. Anderson, Campbell, Calif., assignor, by mesne
assignments, to Filper Corporation
Filed Feb. 29, 1960, Ser. No. 11,916
23 Claims. (Cl. 198—34)

The present invention relates to the feeding of articles such as fruit, for example, in processing operations, and is concerned more particularly with improved methods and apparatus for providing a positive reliable spaced apart article-by-article feed from a bulk supply of such articles.

The handling of fresh fruit and vegetable articles as preliminary to automatic processing operations has always presented a problem as it is desirable to utilize articles varying widely in size, say from 1½ inch diameter to 4 inches in diameter in the same variety of fruit and in the same processing operation. At the same time in most of the processing equipment it is necessary or highly desirable to provide a timed article-by-article feed with articles in spaced apart relation in order to feed properly the processing equipment which is to handle the articles such as is found in the automatic processing of peaches, apples and the like. The problem is further complicated by the fact that there are certain natural irregularities in the shape of the article being handled so that one side of the article will present a substantially flat surface upon which it will tend to remain stable, such as the blossom end of peaches and apples.

While many attempts have been made to obtain an article-by-article feed for orchard run fruit and vegetable articles, for the most part these have been more or less unsuccessful in obtaining a feeder which will not double feed or skip.

The method and apparatus of the present invention affords a reliable accurate article-by-article feed from an ungraded bulk supply with high efficiency. This is effected in part by controlling the articles after they leave the bulk feed and while they are being handled so that they are under constant movement or agitation in a desirable fashion so as to prevent them from reaching a static state where one of their natural irregularities such as a flat surface or a depression, such as found in many fruit articles, may cause interference and prevent their removal from this static state.

It is the general object of the invention to provide an improved feed for articles such as fruit for example, in which the articles are taken from a bulk supply, and are placed in spaced apart timed relation for delivery to a processing apparatus.

Another general object of the invention is to provide methods and apparatus of the above character in which the articles are first placed in an abutting file of moving articles and the adjacent articles are subjected to controlled agitation or movement so as to avoid interference, one with the other, in producing the timed spaced apart feed thereof.

A further general object of the invention is to provide improved methods and apparatus for producing a timed feed of articles in spaced apart relation in which articles of varying size can be handled without producing an error in the feed.

Another object of the invention is to provide methods and apparatus for producing a timed feed of articles in which an occasional article feeding as a second layer over a single file will be caused to enter the single file automatically without interfering with the feeding operation.

Another object of the invention is to provide methods and apparatus in which in a file of abutting articles a rotational effect of gradually increased speed is applied to the articles in a direction transversely to the path of flow of the articles so as to advantageously control the articles during the feeding operation.

Other objects and advantages of the invention will be apparent from the following descripion of certain preferred embodiments thereof, taken in conjunction with the attached drawings, in which:

FIG. 1 is a plan view of one preferred form of the invention;

FIG. 2 is a sectional view taken in a plane indicated with the line 2—2 in FIG. 3;

FIG. 3 is a side elevational view of the apparatus as indicated by the line 3—3 in FIG. 1;

FIG. 4 is a fragmentary elevational view of a portion of the drive and is indicated by the line 4—4 in FIG. 3;

FIG. 5 is a fragmentary sectional view taken as indicated by the line 5—5 of FIG. 3;

FIGS. 6, 7, and 8 are perspective operational views of the apparatus illustrated in FIGS. 1 and 3;

FIG. 9 is a side elevational view of another modification of the invention;

FIG. 10 is a fragmentary sectional view taken in a plane indicated by the line 10—10 in FIG. 9;

FIG. 11 is a plan view of the apparatus taken as indicated by the line 11—11 in FIG. 9;

FIG. 12 is a fragmentary sectional view taken in a plane indicated by the line 12—12 in FIG. 9;

FIG. 13 is an end elevational view of a modified form of the invention;

FIG. 14 is a side elevational view of the apparatus shown in FIG. 13;

FIG. 15 is a plan view of the apparatus shown in FIGS. 13 and 14;

FIG. 16 is a schematic view illustrating the operation of the apparatus shown in FIGS. 13 through 15.

The apparatus provides as a source of supply of articles, a conventional so-called merry-go-round feed including a laterally inclined conveyor 10 from which articles may be discharged around a deflector 9 and through an opening or gate 11 in the wall 12 into the feed apparatus indicated generally at 13, and this feed apparatus handles a single file of abutting articles and transfers the articles from this file one-by-one to a delivery trough 14 as will be described hereinafter.

Referring to FIGS. 1 and 3, the feed apparatus includes a first feeding section comprising a pair of substantially inclined parallel rolls 21 and 22 between a pair of guides 18 and 19. The roll 22 is slightly higher in elevation, and presents an upwardly moving surface in the V trough between the rolls. The roll 22 carries an article controlling rib 23 which is somewhat spiral in shape, though not necessary so, and provides an article agitating member on the roll. The construction of the rib 23 does not produce a screw feed of the articles along the roll but produces successive movement or agitation of the articles. The inclination of the feed rolls 21 and 22 from their upper end adjacent the wall 12 to their lower discharge ends providing a gravity component to the feed, which together with the rotation of the articles by the rolls 21 and 22 both of which rotate in the same direction produces a feeding movement of the articles in abutting relation therealong.

The second phase of the article feed is along an inclined trough formed by a pair of cones 26 and 27 which are connected to support and drive the respective rolls 21 and 22 through universal joints 21a and 22a adjacent their apexes, and are mounted and supported on respective shafts 28 and 29 which are driven in the manner later described. The higher cone 27 has its trough forming surface rotating upwardly and the cone 26 has its trough forming surface rotating downwardly so that the two cones impart a transverse rotation effect to articles therealong with an increased speed of the rotation effect near the base of the cone as compared with the apex of the cone due to the increase of diameter. This transverse rotation is generally about an axis parallel to the trough or path along which the articles travel so that the articles in abutting relation along this trough are under constant relative movement with respect to each other due to the varying rates of rotation.

The third phase of the feeding apparatus comprises an article removing means operative at the end of the trough formed by the cones 26 and 27, where the article will move into a pocket formed in part by the cones and in part by an endwall 31, and this article removing means comprises a cylinder 36 mounted about an inclined axis on a sleeve 37 and driven by a sprocket 38 thereon by means later described. This cylinder 36 provides an article supporting and discharge surface from which project six article lifting means in the form of rods 39 projecting outwardly at an angle inclined to the surface and having a pair of laterally projecting rod portions 41 in trailing relation with respect to the rods 39 so as to provide an effective lifting pocket upon articles of the maximum diameter as well as upon articles of minimum diameter.

Cooperating with the trough between the cones 26 and 27 at the end thereof and with the flights or article removers 39 is a shutter mechanism comprising a shutter member 46 carried by a sleeve 47 and having three equally spaced shutters 46a which have curved ends and rotate in the opposite direction from the cone 26 but have twice the speed of the lifters or flights 39 so that there will always be a shutter 46a in the same operative relation to a flight or lifter 39 and forming the moving end of the pocket portion at the ends of the cones 26 and 27, and also providing a gravity discharge opening 51 leading to the trough 14 for a article being carried upwardly by a flight 39.

As seen in FIG. 3, a suitable drive may be provided including the shutter sleeve 47 for the shutter 46 which is journaled in a mounting bushing 56 and is carried by a frame member 57. Mounted on this frame member 57 are a pair of bearings 58 for the drive shaft 59 having a pulley 61 to receive a belt from a suitable drive motor (not shown). The shaft 61 bears respective sprockets 62, 63 and 64 for the chains 66, 67 and 68 which lead to a sprocket 69 on the shaft 28, a sprocket 38 on the sleeve 37 and a sprocket 71 on the sleeve 47. The speed drives are such that the shutter member 46 is driven at twice the speed of the flights 39, and the cones 26 and 27 are driven at three times the speed of the flights 39. The cone 27 and its shaft 29 are driven through the pulley 30 from the motor, and the cone 27 is driven preferably at a slightly higher speed than the cone 26. The speed ratio between the flights and the shutters is critical because of the relation between the numbers, however, the speed ratio with respect to the cones is not critical, it only being desirable that the cones be driven at least as fast as, and preferably faster, than the speed of the flights.

The operation of the apparatus will be briefly described.

The fruit is fed from the bulk supply so as to provide a file of abutting articles in the feed trough defined by the rolls 21 and 22 and the cones 26 and 27, respectively, this feed trough being inclined downwardly toward its discharge end so that the articles being rollable are subjected to a gravity effect to move along the trough by rolling or sliding. It will be noted that each article in this single file of abutting articles in the feed trough is subjected to a different moving or agitating operation. This is effected between the rolls 21 and 22 by the rib 23 on the roll 22 and by the increasing diameter of the cones 26 and 27 so that at no time can an article become static with respect to an adjacent article, but they are always in live motion effect. Also, the articles are at all times subjected to a transverse rotation effect (in addition to the gravity action) about an axis generally parallel to their path along the trough. The speed of this transverse rotation effect increases along the cones.

It will be noted also that if an article happens to be fed from the conveyor 10 through the opening 11 as a second layer article (where it will be held by the racks 18 and 19), it will be resting on two articles, the leading one of which is in a downward position with respect to the trailing one so that this upper article, by virtue of the shifting movement between the articles supporting it, tends to separate the two articles and make its way down into the single file.

It will be noted also that the endmost article in the feed trough will be in position to abut the pocket wall 31a and the stationary wall 31. However, at the time the article is to be lifted by a finger 39, one of the shutters 46a intervenes to form a moving wall of the pocket, and this shutter 46a moving upwardly at this point rotates the article in a direction (see FIG. 6) to move it out of the path of articles without being pinched by the next succeeding article in contact with it. In other words, it is not moved bodily out of the pocket and the file, but it is rotated out of the file, and this rotating of the article out of the path of file may cause a slight upward movement of the article ahead of its actual engagement by one of the flights or lifter arms 39. Subsequently, a flight 39 will pick up the article and move it upwardly, and the shutter 46a, moving at a faster speed (FIGS. 7 and 8) will move out of the way of the article as the article is aligned with the opening to the trough 14. By virtue of the inclined position of the cylindrical surface of the cylinder 36, the article will roll into the feed trough 14 and down the feed trough 14 to a portion of the processing apparatus. In FIG. 6 an apple A is shown moving down the trough 14.

FIGS. 9 through 12 illustrate another modification of the invention which includes a base 81 upon which three standards 82, 83 and 84 are provided to mount the equipment. The fruit or similar articles are fed to the equipment by means of a downwardly inclined V-shaped trough formed by members 86 and 87, the member 87 terminating at the apex of a cone or feed member 88 and the trough member 86 extending parallel to the surface of the cone 88 to continue the trough and being supported on the upright 83 of the frame. The apex of the cone is journaled on a pin 89 supported on the trough member 87. The cone member 88 is a 60 degree included cone with its uppermost surface in substantially a horizontal plane. The cone 88 is supported by a shaft 91 similarly to the cone 26, the cone 88 also rotates in the direction to cause its trough forming surface to move upwardly.

Associated with the cone 88 (FIGS. 9 and 11) is a cylinder 91 journaled coaxially with the cone 88 about an inclined axis and having four outwardly inclined flights or rod lifters 92, each having a projection or pin 93 extending laterally inward therefrom to overlie the cylinder 91. The cylinder rotates in the same direction as the cone 88 to cause fruit to be discharged onto a trough 95 when free of a stationary barrier plate 96 and a shutter member 97 which is carried by a sleeve 98 and has two shutters 97a. The shutter member 97 is rotated at twice the speed of the lifting cylinder 91, and at slightly less than the speed of the cone 88. Usually the cone 88 would have a speed of about three times that of the cylinder 91. The drive for the cone 88, the cylinder 91 and the shutter member 97 is similar to that described in connection with the cone 26, the flight member 36, and the shutter 46, of FIGS. 1 and 3.

As seen more particularly in FIG. 11, the trough member 86 is cut away to pass the lifter fingers or flights 92, and there is also a small trough section 87a adjacent to the cylinder 91 to support articles in the pocket.

The flight members 92 of the lifter mechanism are disposed so as to pick up a small article, of about one to one and one-half inches in diameter, as well as larger articles of about 4 inches in diameter in the same manner as the previously described modification.

The operation of modification of FIGS. 9 through 12 is generally similar to that described in connection with FIGS. 1 through 8, wherein the cone 88 gives the products a shifting movement or rotational effect of differential effect, the rotating effect increasing as the article moves to the larger diameter of the cone so that at all times the articles are shifting or rotating with respect to each other. The ratio of the drive for the cylinder 91 and the shutter member 97 is such that one of the shutters 97a is always available to control a product carried up by the flight 92 until it is in position for discharge.

FIGS. 13 through 16 illustrate another modification of the invention. The feed apparatus includes an inclined feed trough formed by members 101 and 102 and leading from a V-shaped opening 103 in the end wall of the housing. Fruit travels into engagement with a cone 106 mounted about an inclined axis in an inclined wall 107 of the casing or frame and being driven from a pulley 108 at a suitable speed. The large end of the cone is contiguous to a wall 107 which defines a discharge abutment leading to an inclined discharge wall 109 at the side of the housing.

Articles traveling down the trough 101, 102 encounters the periphery of the cone 106 as a part of a trough formed with the member 101, and are agitated and rotated transversely by the rotating cone 106 until the article arrives at a pocket position 110 (where the cone and the wall surface of the wall 107 form a pocket) for engagement by sets of lifter fingers 111 and 112 carried by the cone 106. Two sets of lifter fingers are provided, these lifter fingers passing between cut-away portions 101a of the trough member 101, and fingers 109a mounted on the discharge wall 109. The trough member 102 is continued as a wall extension 102a which has a concave curved end surface extending adjacent over the top of the cone so as to provide a barrier against lifting by the cone of an article before it reaches the pocket 110. The concaved end blocks lifting of articles not in the pocket while permitting the discharge of large diameter (about four inches) articles from the pocket past the end of the wall 102.

From the above description it will be apparent that the various modifications all include a means for progressively increasing the speed of transverse rotation of an article carried thereon to a lifting pocket where each article is engaged by a flight or lifter member and carried to a point of discharge. Also, the upper surface of the cone is horizontal or substantially so and each cone provides a descending trough along which the article must travel to reach a lifting pocket or station. Thus, articles travel under a gravity urge and while so traveling, by either rolling or sliding, are subjected to a transverse rotating effect which is substantially about an axis parallel to the path of travel in reaching the pocket, and which transverse rotating effect increases in speed as the article approaches the pocket. Thus, adjacent abutting articles all have a relative movement to each other. In this way, at the time of lifting of an article from the pocket, it is in motion with reference to the next adjacent abutting article and so is freed easily from the file or line of abutting articles.

While I have shown and described certain preferred methods and certain preferred apparatus for carrying out the invention, it will be apparent that the invention is capable of variation and modification from the form shown, so that the scope thereof should be limited only by the scope of the claims appended hereto.

I claim:

1. The method of receiving a single file of abutting articles with an occasional article supported on the file as a second layer and resolving it to a single file of abutting articles without a second layer and thereafter changing said abutting file to a timed article-by-article feed in spaced apart relation, which comprises feeding articles from a bulk supply as a single file of normally abutting articles moving along a downwardly inclined path, applying a rotating effect to the articles in a direction to produce article rotation about an axis substantially parallel to said path, progressively increasing the speed of said effect along at least the portion of said path adjacent and leading to the discharge end thereof, whereby a second layer article will move down between the articles supporting it, and at equal intervals lifting each successive endmost article from said path to provide said spaced apart timed feed thereof.

2. The method of receiving a single file of abutting articles with an occasional article supported on the file as a second layer and resolving it to a single file of abutting articles without a second layer and thereafter changing said abutting file to a timed article-by-article feed, which comprises feeding articles from a bulk supply as a single file of normally abutting articles, applying a rotating effect to the articles in a direction to produce article rotation about an axis substantially parallel to said file, progressively increasing the speed of said effect along at least the portion of said file adjacent and leading to the discharge end thereof, whereby a second layer article will move down between the articles supporting it, and at equal intervals removing each successive endmost article from said file to provide said spaced apart timed feed thereof.

3. The method of receiving a single file of abutting articles and changing said abutting file to a timed article-by-article feed in spaced apart relation, which comprises feeding articles from a bulk supply as a single file of normally abutting articles moving along a downwardly inclined path, applying a rotating effect to the articles in a direction to produce article rotation about an axis substantially parallel to said path, progressively increasing the speed of said effect along at least the portion of said path adjacent to and leading to the discharge end thereof, and at equal intervals lifting each successive endmost article from said path to provide said spaced apart timed feed thereof.

4. The method of receiving a single file of abutting articles and changing said abutting file to a timed article-by-article feed in spaced apart relation, which comprises feeding articles from a bulk supply as a single file of normally abutting articles, applying a rotating effect to the articles in a direction to produce article rotation about an axis substantially parallel to said file, progressively increasing the speed of said effect along at least the portion of said file adjacent to and leading to the discharge end thereof, and at equal intervals removing each successive endmost article from said file to provide said spaced apart timed feed thereof.

5. The method of receiving a single file of abutting articles and changing said abutting file to an article-by-article feed, which comprises providing a single file of normally abutting articles moving along a downwardly inclined path, continuously applying an article moving or shifting effect so as at all times to provide relative movement between adjacent abutting articles, maintaining the abutting relation of the articles throughout the length of said path, and successively removing the endmost articles from said path.

6. A method of feeding articles of varying size and shape, which comprises providing a single file of normally abutting articles, applying a rotating effect to the articles in a direction to produce article rotation about an axis substantially parallel to said file, progressively increasing the speed of said effect along at least a portion of said file adjacent to and leading to the discharge end thereof, removing each successive endmost article from said file, and during said removing step applying a twisting effect to the article so as to remove it from the file without tending to disturb the next adjacent abutting article.

7. A method of feeding articles of varying size and shape, which comprises providing an inclined single file of normally abutting articles, applying a rotating effect to the articles in a direction to produce article rotation about an axis substantially parallel to said file, progressively increasing the speed of said effect along at least a portion of said file adjacent to and leading to the discharge end thereof, removing each successive endmost article from the lowest end of said file, and during said removing step applying a twisting effect to the article so as to remove it from the file without tending to disturb the next adjacent abutting article.

8. In a feeder for articles such as fruit, a bulk feeding means for articles, means for receiving a single file feed of abutting articles from said bulk feeding means and providing a downwardly inclined path defined at least in part by a pair of cones in side-by-side relation to provide a supporting trough for said single file of abutting articles, means for rotating said cones in the same direction to produce relative movement between adjacent abutting articles, and article discharge means adjacent the large end of the cones for effecting an article-by-article discharge from said trough in timed relation.

9. In a feeder for articles such as fruit, means for supporting a single file feed of abutting articles and providing a downwardly inclined path defined at least in part by a pair of cones in side-by-side relation to provide a supporting trough for said single file of abutting articles, means for rotating said cones in the same direction to produce relative movement between adjacent abutting articles, and article discharge means adjacent the large end of the cones for effecting an article-by-article discharge from said trough in timed relation.

10. In a feeder for articles such as fruit, means for receiving a single file feed of abutting articles and providing a downwardly inclined path defined at least in part by a pair of cones in side-by-side relation to provide a supporting trough for said single file of abutting articles, means for rotating said cones in the same direction, and article discharge means adjacent the large end of the cones for effecting an article-by-article discharge from said trough in timed relation.

11. In a feeder for articles such as fruit as recited in claim 10, in which said article discharge means includes a movable member adjacent the large end of one of the cones and disposed to pass upwardly through said trough and carrying at least one lifter for lifting the endmost articles from said trough.

12. In a feeder for articles such as fruit as recited in claim 10, in which said article discharge means comprises a cylinder mounted for rotation adjacent the large end of one of the cones, and said cylinder providing an article supporting surface about its periphery and including at least one flight or lifter member thereon for lifting successive endmost articles from said trough.

13. In a feeder for articles such as fruit as recited in claim 10, in which said article discharge means comprises a cylinder mounted adjacent the large end of one of said cones, said cylinder providing an inclined article supporting periphery, lifter means carried by said cylinder and passing through said trough for lifting successively the endmost article therefrom, and a shutter member mounted adjacent said cylinder and moving in synchronism therein to control discharge of an article therefrom.

14. In a feeder for articles such as fruit as recited in claim 13, in which said shutter member is disposed to move through said trough at the end thereof with said lifting means so as to provide a moving article engaging wall during lifting of the fruit therefrom, and said shutter means has relative movement with respect to said cylinder to provide a discharge opening for the fruit after it is removed from said trough.

15. In a feeder for articles such as fruit as recited in claim 13, in which said lifting means comprises at least two lifter members about its periphery, and said shutter means comprises at least one shutter, and in which the driving means for said shutter means operates at twice the speed as for said lifting means.

16. In a feeder for articles such as fruit, means for supporting a single file of abutting articles in a downwardly inclined path defined at least in part by a cone in side-by-side relation with an adjacent article supporting member to constitute an article supporting trough, means for rotating said cone so that its article-engaging surface is moving upwardly, and article discharge means adjacent the large end of the cone for effecting an article-by-article discharge from said trough of the successive endmost article therein.

17. In a feeder for articles such as fruit as recited in claim 16 in which said article discharge means comprises flight means carried by said cone and disposed to pass upwardly through said trough at the end thereof to lift the endmost article therefrom.

18. In a feeder for articles such as fruit as recited in claim 17, in which said article discharge means includes a movable member mounted adjacent the large end of the cone and disposed to pass upwardly through said trough and carrying at least one lifter for lifting the successive endmost articles from said trough.

19. In a feeder for articles such as fruit as recited in claim 16, in which said article discharge means comprises a cylinder mounted for rotation adjacent the large end of the cone providing an inclined article supporting surface about its periphery and including at least one flight or lifter member thereon for lifting successive endmost articles from said trough.

20. In a feeder for articles such as fruit as recited in claim 16, in which said article discharge means comprises a cylinder mounted adjacent the large end of said cone and providing an inclined article supporting periphery, lifter means carried by said cylinder and passing through said trough for lifting successively endmost articles therefrom, and a shutter member mounted adjacent said cylinder and moving in synchronism therein to control discharge of an article therefrom.

21. In a feeder for articles such as fruit as recited in claim 20, in which said shutter member moves through said trough at the discharge end thereof with said lifting means so as to provide a moving article-engaging wall during lifting of the fruit therefrom, and said shutter means subsequently has relative movement with respect to said cylinder to provide a discharge opening for the fruit after it is removed from said trough.

22. In a feeder for articles such as fruit as recited in claim 20, in which said lifting means comprises at least two lifter members about its periphery, and said shutter member comprises at least one shutter, and in which the driving means for said shutter means operates at twice the speed as for said lifting means.

23. In a feeder for articles such as fruit, a bulk feeding means for articles, means for receiving a single file feed of abutting articles from said bulk feeding means and providing a downwardly inclined path defined at least in part by a cone in side-by-side relation with an adjacent article supporting member to provide a supporting trough for said single file of abutting articles, means for effecting rotative movement of said articles about an axis generally parallel to said path including means for rotating said cone so that its article engaging surface is moving upwardly, and article discharge means adjacent the large end of the cone for effecting an article-by-article discharge from said trough in timed relation.

References Cited in the file of this patent

UNITED STATES PATENTS

| | | |
|---|---|---|
| 858,125 | Waldron | June 25, 1907 |
| 1,663,987 | Jamieson | Mar. 27, 1928 |
| 2,596,798 | Thompson | May 13, 1952 |
| 2,877,680 | Brown | Mar. 17, 1959 |

FOREIGN PATENTS

| | | |
|---|---|---|
| 741,283 | Great Britain | Nov. 30, 1955 |
| 882,512 | France | June 7, 1943 |